No. 878,851. PATENTED FEB. 11, 1908.
J. H. ZOLDOWSKI & P. F. BARANEK.
HORSE RELEASING MEANS FOR VEHICLES.
APPLICATION FILED OCT. 23, 1907.
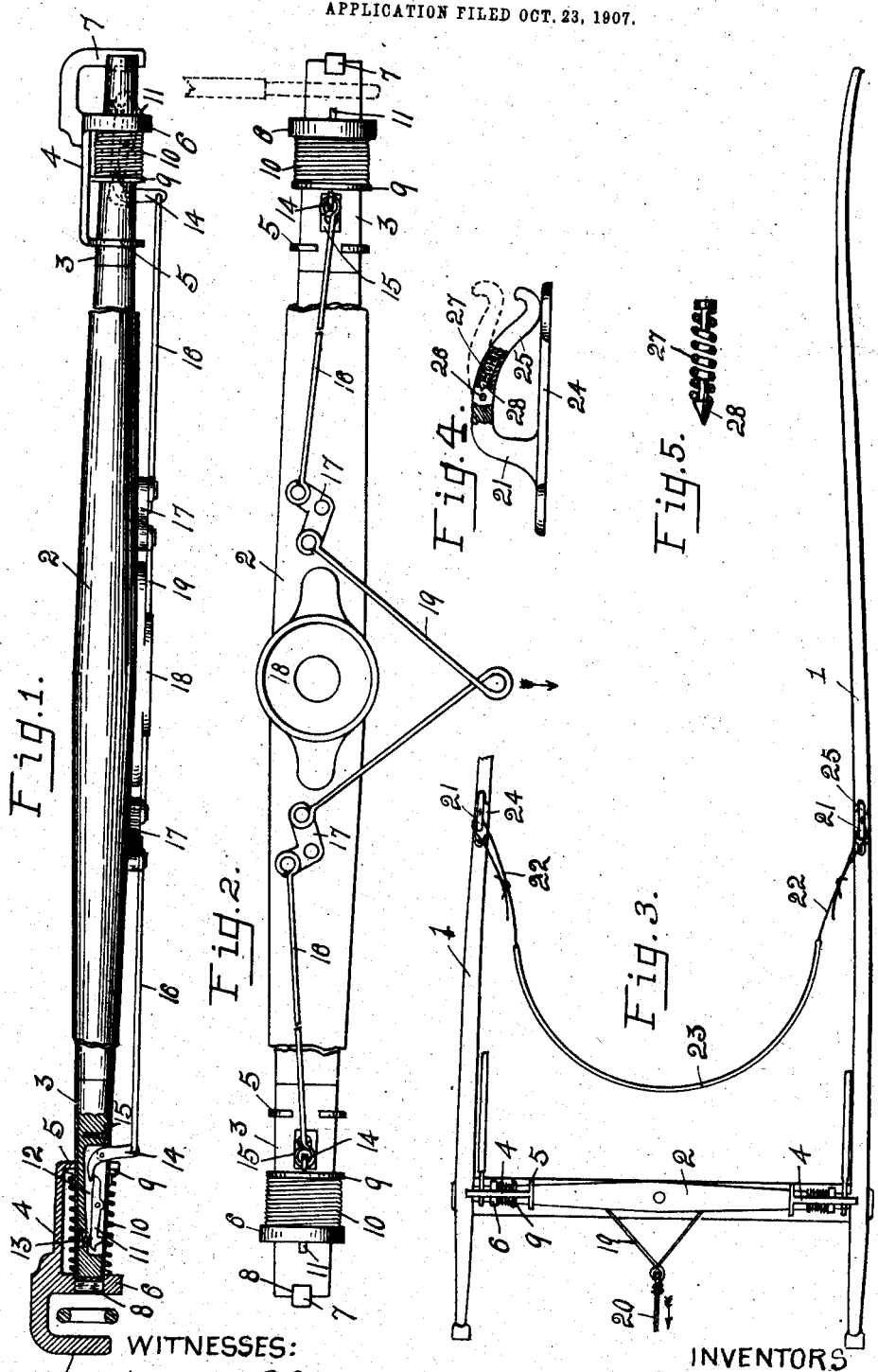
WITNESSES:
D. C. Walter
Lowell Schreiber
INVENTORS
J. H. Zoldowski,
P. F. Baranek,
By Owen & Owen
Their attys.

UNITED STATES PATENT OFFICE.

JOHN H. ZOLDOWSKI AND PETER F. BARANEK, OF TOLEDO, OHIO.

HORSE-RELEASING MEANS FOR VEHICLES.

No. 878,851.  Specification of Letters Patent.  Patented Feb. 11, 1908.

Application filed October 23, 1907. Serial No. 398,814.

*To all whom it may concern:*

Be it known that we, JOHN H. ZOLDOWSKI and PETER F. BARANEK, citizens of the United States, and residents of Toledo, in the county of Lucas and State of Ohio, have invented certain new and useful Improvements in Horse-Releasing Means for Vehicles; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to vehicles, and particularly to attachments therefor adapted to effect an instantaneous release of a horse from the vehicle should it run away or become unmanageable.

The object of our invention is the provision of a simplified, improved and highly efficient apparatus of this class, which is capable of being attached to any of the whiffletrees ordinarily used on wagons, carriages, or the like, and when attached to provide a means which is easily and quickly operative to release a horse or horses at will from the associated vehicle.

A further object of our invention is the provision of an improved holdback hook for use in connection with our improved horse-releasing apparatus, which permits a withdrawal under pressure of a holdback strap therefrom as a horse leaves the thills of the vehicle.

The operation, construction and arrangement of the parts of our invention are fully described in the following specification and illustrated in the accompanying drawings, in which,—

Figure 1 is a front view of a whiffletree equipped with our invention with one tug-retainer shown in contracted and the other in extended position thereon. Fig. 2 is a bottom plan view of the same with both tug-retainers in contracted position. Fig. 3 is a plan of a portion of a pair of thills with our tug and holdback-releasing means associated therewith. Fig. 4 is a detail, partly in section, of our improved holdback hook, and Fig. 5 is a longitudinal section of the compression-spring associated with the holdback hook.

Referring to the drawings, 1 designates a pair of ordinary carriage thills and 2 the whiffletree carried thereby.

Secured to each end of the whiffletree is a metal cap or sleeve 3, which is of suitable shape to conform to the cross-sectional contour of the whiffletree end on which it is mounted. Slidingly mounted on each cap or sleeve 3 is a tug-retainer member 4, which is provided with the laterally-extended sleeve encircling parts 5 and 6 and the L-shaped tongue 7, which latter projects outwardly from the outer encircling part 6 and has the inner face of its free end portion disposed to seat in a transverse recess 8 provided in the whiffletree end, as shown. A stop-collar 9 is fixed to each sleeve 3 intermediate the two encircling or guide parts 5 and 6 of each retainer in position to coact with the part 5 to stop the outward movement of the retainer relative to the whiffletree end when the part 6 has moved to the extreme end thereof as shown at the left of Fig. 1. The outward movement of the retainer is actuated by a coiled compression-spring 10, which encircles the sleeve 3 with its ends in abutment with the part 6 and collar 9.

A pawl or catch 11 coacts with the part 6 of each retainer 4 to normally lock it in contracted position. This pawl or catch is pivotally mounted in a recess or socket 12 provided in the end of the whiffletree interiorly of the sleeve 3 and is acted on by a compression-spring 13 to normally throw its hook through an alining opening in the sleeve in position to obstruct the path of movement of the retainer part 6. The outer end of the pawl or catch is provided with a wiper face to permit the part 6 to be forced past the same on its inward movement. A curved trip-lever 14 has its inner end projected through an opening in the under side of the sleeve and into the socket 12 in position to engage the inner end of the catch 11 to effect a releasing movement thereof when the lever is rocked. The lever 14 is fulcrumed to a plate 15, which is secured within the opening in the sleeve through which the lever passes. The outer end of the lever 14 is attached to a link or rod 16, which extends longitudinally of the whiffletree and has its inner end attached to one end of a bell-crank lever 17, which is fulcrumed to the under side of the whiffletree adjacent to the contiguous side of its center plate 18, as shown. The two bell-crank levers 17 of a whiffletree have their inwardly projecting arms attached to the opposite ends of a common pull-member 19, which is shown as being V-shaped and as having a loop or eye provided at its point. This pull-member is intended to extend rearwardly from the whiffletree in substantially a horizontal plane and to have its eye engaged by a cord or other pull means 20, which extends back to the carriage body in position for the occupant to pull the same.

21 designates a holdback hook, one of which is secured to each thill in position to be engaged by the holdback straps 22, which connect to the harness breeching 23. This hook is carried by a plate 24 by means of which it is secured to the thill and has its terminal portion formed of a separate tongue 25, which is pivotally connected to the hook body by a lapping joint, as at 26. The tongue 25 has its outer end curved toward the plate 24 and retained in yielding contact therewith by a coiled compression-spring 27. This spring is positioned in a socket disposed longitudinally in the rear end of the tongue 25 and carries a conically-headed plug 28 at its outer or exposed end, the point of which seats in a depression in the end of the body portion of the hook, said depression being so positioned relative to the pivot 26 as to cause the spring to resist an opening or outward movement of the tongue 25. It is thus apparent that the hook and its tongue normally form a closed eye with the plate 24, and that a forward pulling of a strap engaged therewith will force the tongue open against the tension of its spring and permit the strap to pass out of engagement with the hook.

In the operation of our invention, the tug ends are inserted between the parts 6 and tongues 7 of the retainer-members 4 and the whole then pushed inwardly on the whiffletree against the tension of the springs 10 with the whiffletree ends passing through the tug eyes. When the retainer members have been pushed to their limit of inward movement the catches 11 engage the outer sides of the parts 6 to lock the members in contracted position and the ends of the tongues 7 seat in the recessed ends of the whiffletree to retain the tugs in engagement therewith. To release the horse from the whiffletree and thills for any reason it is only necessary to pull the cord or other means 20, thus rocking the two bell-crank levers 17, which in turn rock the trip-levers 14, through the medium of the links 16, and impart releasing movements to the catches 11 against the tension of the springs 13 and permitting the retainer-members 4 to move outwardly on the whiffletree ends under the influence of the springs 10. As the members 4 move outwardly the tug ends are ejected thereby from engagement with the whiffletree ends. As the horse moves forward relative to the thills the holdback straps release themselves from the hooks 21 by passing under the spring-pressed tongues 25 thereof.

We wish it understood that we do not desire to restrict ourselves to the particular construction and arrangement of parts shown and described, as obvious modifications will occur to persons skilled in the art.

Having thus described our invention, what we claim as new and desire to secure by Letters Patent, is,—

In combination, a whiffletree having its end portions longitudinally recessed, sleeves incasing the ends and recessed portions of the whiffletree and having transversely recessed ends, retainer-members slidingly carried by each sleeve, said members each having two lateral parts which encircle the sleeves and an outer end tongue, the end portion of which is transversely bent in spaced relation to the contiguous one of said parts and adapted to seat in the sleeve end recess when said member is at its limit of inward movement on the sleeve, catches mounted in the whiffletree recesses and spring-actuated to normally cause their catch ends to protrude through the sleeve in position to engage the outer of said parts when the member is at its limit of inward movement to prevent an outward movement thereof, a collar fixed to each sleeve between said parts, a coiled compression-spring carried by each sleeve and acting on said collar and the outer of said parts to influence an outward movement of the member, angled trip-levers carried by the whiffletree ends with their inner ends projecting through the sleeve into the incased recess in releasing engagement with the catch, a bell-crank lever carried by the whiffletree in association with each trip-lever, connection between the trip and bell-levers, and a V-shaped member having an end in connection with each bell-lever whereby a pull on the former effects a rocking of both bell-levers and a consequent movement of the trip-levers to release the catches to permit the retainer-members to move outwardly on the sleeves under the influence of their springs, substantially as described.

In testimony whereof we have hereunto signed our names to this specification in the presence of two subscribing witnesses.

JOHN H. ZOLDOWSKI.
PETER F. BARANEK.

Witnesses:
C. W. OWEN,
HAZEL B. HIETT.